Oct. 28, 1930.  R. ANDERSON  1,779,957
BROOCH CLASP
Filed Feb. 19, 1930
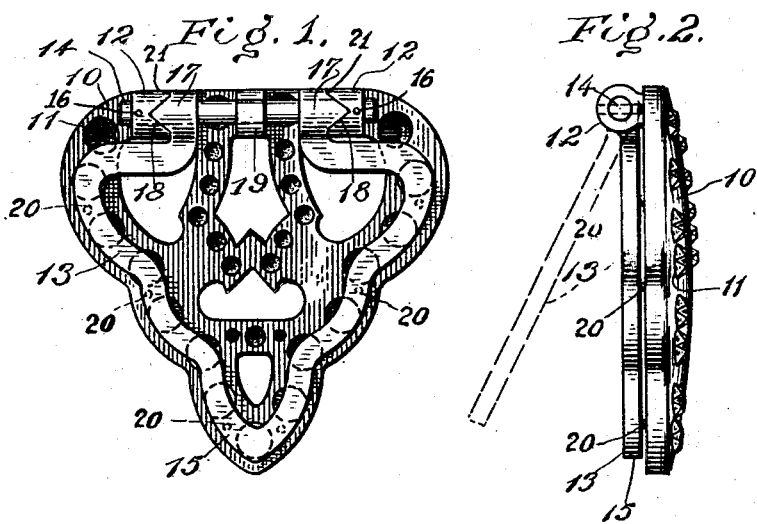
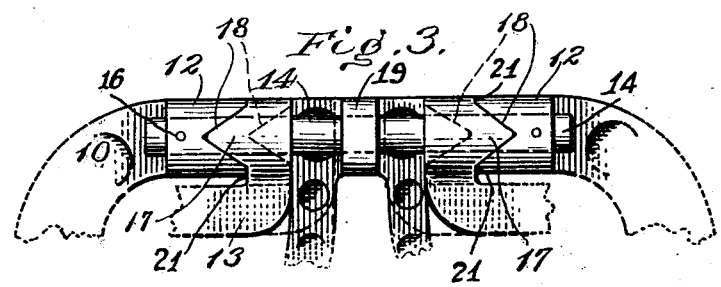
Inventor
Robert Anderson
by
Conrad A. Vritech
Attorney Patented Oct. 28, 1930

1,779,957

UNITED STATES PATENT OFFICE

ROBERT ANDERSON, OF NEW YORK, N. Y.

BROOCH CLASP

Application filed February 19, 1930. Serial No. 429,542.

This invention is closely related to brooch clasps or fastenings and is intended to be worn either purely as an ornamental article of jewelry or to serve some utilitarian purpose, as for example in securing together various articles of apparel.

In the accompanying drawings, showing an illustrative embodiment of the invention, Figure 1 is a rear view of a brooch made up in accordance with my invention;

Figure 2 is an edge view of the device shown in Figure 1, and

Figure 3 is a top view of the device on an enlarged scale and representing the keeper or bail in an open position.

The preferred form of the device shown in the illustration consists essentially of an ornamental front or body portion 10 constituting a brooch. This brooch body is illustrated as having apertures 11 formed therein for receiving precious stones, it being customary to so ornament analogous devices at the present time. Upon the rear side of the brooch adjacent one of its ends there are provided two integral bearing members 12 preferably in the form of shells or bored hubs 12. The opposing faces of these hubs are shown formed with a pair of V-shaped notches or recesses 13. The brooch hubs 12 carry a pintle 14 on which is mounted the bail or keeper member 15 presently to be described. The pintle 14 preferably has a press fit in the brooch hubs 12, and for assuring rigidity holes may be drilled through the hubs 12 and the pintle 14, into which holes suitable pins 16 are driven. The opposing faces of the hubs 12 are maintained practically in rigid and unyielding relation.

The bail or keeper 15 in itself constitutes its opening and closing spring member, it being made of spring metal and of an appropriate shape. It also preferably has a shape conforming to that of the brooch body, but of slightly smaller outline so as to be hidden from view when in its closed position. The bail or keeper 15 carries at its ends hubs or bosses 17 bored to have a nice working fit on the pintle 14 between the brooch hubs 12. The keeper hubs are formed on their outer end faces with V-shaped projections or cams 14 which are adapted to register with the V-shaped notches or recesses 13 in the hubs 12 fixed on the brooch. The opposing faces of the brooch hubs 12 are located at a sufficient distance apart in relation to the formation of the keeper or bail 15 that the outer faces of the bail hubs are by virtue of the resiliency of the bail held in engagement with the notches in the brooch hubs, the organization of the parts being such that the bail or keeper has a tendency when approaching the closed position of snapping into position.

The brooch hubs 12 have more or less flat surfaces or lands 21 between the notches 13, which permit the projections 18 of the complementary hub member 17 to have a surface upon which to rest when the keeper and brooch body are in the open position.

The resiliency or spring action of the keeper or bail member 15 has a tendency to hold the hub members 17 normally pressed outwardly so that the V-shaped projections therein will normally be firmly seated within the V-shaped recesses 13 in the brooch hubs 12.

The pintle 14 is provided midway between the brooch hub members 12 with a shoulder 19 which serves as a stop to limit the inward movement of the keeper hub members 17. In order to facilitate the holding of the keeper and its action in holding together various articles of apparel which are between it and the brooch body, the latter is furnished with a plurality of pins or projections 20 for acting in a well known manner.

When it is desired to open the closed clasp, the operator may take hold of the keeper and of the brooch body or of the garment upon which it rests, and raise the keeper or bail, when it approaches its open position, the V- shaped projections ride on the lands 21 into the fully open position.

When it is desired to apply the brooch clasp it is merely necessary to insert the garment or garments between the keeper and the brooch body and then press the keeper toward the body, the camming action causing the parts to snap into the fully closed position at which they are securely held.

The movement of the keeper in relation to the brooch body may be facilitated by the operator pressing together the two sides of the keeper, which eliminates considerable friction in the camming action.

Having thus described my invention, what I claim and desire to secure by Letters Patent is:

1. In a brooch clasp, the combination with a brooch body, a pair of hubs integrally mounted on the brooch body and having opposing faces formed with notches, of a pintle mounted in the hubs and fixed thereto, and a keeper comprising a resilient bail portion carrying a pair of hubs mounted on the pintle and formed with projections for mating with the notches in the brooch body hubs.

2. In a brooch clasp, the combination with a brooch body, a pair of bore hubs integrally mounted upon the brooch body and having opposing faces formed with V-shaped notches and substantially flat lands between the notches, of a pintle mounted in the hubs and fixed thereto, and a keeper comprising a resilient bail portion carrying a pair of hubs mounted on the pintle and formed with V-shaped projections for mating with the notches on the brooch body hubs.

3. In a brooch clasp, the combination with a brooch body, a pair of shells integrally mounted upon the brooch body and having opposing faces formed with flat lands and cam shaped notches, of a pintle mounted in the shells and fixed thereto, and a keeper comprising a resilient bail portion carrying a pair of hubs mounted on the pintle and provided with projections adapted to mate with the cam notches in the shells carried by the body and to ride upon the flat lands.

4. In a brooch clasp, the combination with a brooch body, a pair of shells integrally mounted upon the brooch body and having opposing faces formed with flat lands and cam shaped notches, of a pintle mounted in the shells and fixed thereto, there being a shoulder in the central portion of the pintle, and a keeper comprising a resilient bail portion carrying a pair of hubs mounted on the pintle and provided with projections adapted to mate with the cam notches in the shells carried by the body and to ride upon the flat lands.

5. In a brooch clasp, the combination with a brooch body, of a pair of hubs mounted upon the brooch body and having opposing faces formed with cam notches, of a pintle mounted in the hubs, a keeper having a bail portion and a pair of hubs mounted on the pintle and formed to engage the notches on the brooch body hubs, and a shoulder forming member carried by the pintle for limiting the inward movement of the keeper hubs.

Signed at the city of New York, borough of Manhattan in the county and State of New York, this fifteenth day of February, one thousand nine hundred and thirty.

ROBERT ANDERSON.